(12) United States Patent
Guthrie

(10) Patent No.: US 8,976,318 B2
(45) Date of Patent: Mar. 10, 2015

(54) SYSTEM AND METHOD FOR ZONAL SWITCHING FOR LIGHT STEERING TO PRODUCE AN IMAGE HAVING HIGH DYNAMIC RANGE

(71) Applicant: Christie Digital Systems Canada Inc., Kitchener (CA)

(72) Inventor: Simon Guthrie, Kitchener (CA)

(73) Assignee: Christie Digital Systems USA Inc., Cypress, CA (US)

( * ) Notice: Subject to any disclaimer, the term of this patent is extended or adjusted under 35 U.S.C. 154(b) by 173 days.

(21) Appl. No.: 13/804,322

(22) Filed: Mar. 14, 2013

(65) Prior Publication Data

US 2014/0267978 A1    Sep. 18, 2014

(51) Int. Cl.
*G02F 1/1335* (2006.01)
*G02B 26/00* (2006.01)
*G02B 26/08* (2006.01)
(Continued)

(52) U.S. Cl.
CPC ............ *G02B 26/0833* (2013.01); *G02B 26/08* (2013.01); *G02B 26/0816* (2013.01); *G03B 21/14* (2013.01); *H04N 9/74* (2013.01)
USPC .............. 349/62; 349/5; 359/238; 359/223.1; 359/226.1

(58) Field of Classification Search
CPC ............... G02F 1/133615; G02F 1/133606; G02F 2001/133607; G02B 6/0053; G02B 6/0038; G02B 26/001; G02B 26/0833; G02B 26/0841; G02B 26/085; G02B 26/0816; G02B 26/105; H04N 9/3197; H04N 9/3105; H04N 5/7441; H04B 10/505

USPC .................... 349/62, 5; 359/238, 223.1, 226.1
See application file for complete search history.

(56) References Cited

U.S. PATENT DOCUMENTS 4,492,435 A   1/1985   Banton et al.
5,311,360 A   5/1994   Bloom et al.
(Continued)

FOREIGN PATENT DOCUMENTS

EP          0040302 A2    11/1981
WO       2011031334 A1    3/2011

OTHER PUBLICATIONS

Meng-Hsiung Kiang et al: 11 Silicon-Micromachined Micromirrors with Integrated High-Precision Actuators for External-Cavity Semiconductor Lasers 11, IEEE Photonics Technology Letters, IEEE Service Center, Piscataway, NJ, US, val. 8, No. 1, Jan. 1, 1996, XP011048047, ISSN: 1041-1135.

(Continued)

*Primary Examiner* — Mike Qi
(74) *Attorney, Agent, or Firm* — Perry + Currier Inc.

(57) ABSTRACT

A method and system for zonal switching for light steering to produce an image having high dynamic range is described. The system comprises: a light source for providing light along an optical path; a spatial light modulator for directing portions of the light to off-state and on-state light paths, thereby producing an image, the spatial light modulator having a plurality of illumination zones corresponding to the image; and a set of sequentially-arranged optical elements in the optical path for steering at least some of the light from a first subset of the plurality of illumination zones to a second subset of the plurality of illumination zones to increase the dynamic range of the image. The dwell time of the one or more sequentially arranged optical elements can be modified to steer light.

21 Claims, 6 Drawing Sheets

(51) Int. Cl.
　　　*G03B 21/14*　　(2006.01)
　　　*H04N 9/74*　　(2006.01)

(56)　　　　References Cited

U.S. PATENT DOCUMENTS

| | | | |
|---|---|---|---|
| 6,384,952 B1 * | 5/2002 | Clark et al. | 359/224.1 |
| 7,113,324 B2 | 9/2006 | Lee et al. | |
| 7,126,740 B2 * | 10/2006 | Szczepanek et al. | 359/290 |
| 7,826,121 B2 | 11/2010 | Khan | |
| 7,876,340 B2 | 1/2011 | Russell et al. | |
| 2012/0200829 A1 * | 8/2012 | Bronstein et al. | 353/7 |

OTHER PUBLICATIONS

Corresponding European Patent Application No. 14158903.6, Extended European Search Report dated Jun. 11, 2014.

* cited by examiner

SYSTEM AND METHOD FOR ZONAL SWITCHING FOR LIGHT STEERING TO PRODUCE AN IMAGE HAVING HIGH DYNAMIC RANGE

FIELD

The specification relates generally to projection systems, and specifically to a system and method for zonal switching for light steering to produce an image having high dynamic range.

BACKGROUND

Current projection systems require that the illumination of the spatial light modulator (SLM) be uniform over the entire SLM imaging surface. In other words, the amount of light received by each pixel of the SLM is required by these systems to be generally equal, such that illumination of the brightest areas is limited by the overall illumination of the SLM mirrors. This can result in an image that is not a true representation of the original or desired image, particularly if that original or desired image constitutes an image having high dynamic range.

SUMMARY

According to one implementation, there is provided a system for producing an image having high dynamic range, comprising: a light source for providing light along an optical path; a spatial light modulator for directing portions of the light to off-state and on-state light paths, thereby producing an image, the spatial light modulator having a plurality of illumination zones corresponding to the image; and a set of sequentially-arranged optical elements in the optical path for steering at least some of the light from a first subset of the plurality of illumination zones to a second subset of the plurality of illumination zones to increase the dynamic range of the image.

According to another implementation, the system for producing an image having high dynamic range further comprises an intermediary optical element for capturing and modulating the steered light according to the plurality of illumination zones. According to a related implementation, the modulation comprises homogenizing the steered light. According to a related implementation, the intermediary optical element comprises an array of integrating rods arranged to correspond to the plurality of illumination zones.

According to another implementation, a dwell time of the one or more sequentially arranged optical elements is modified to steer light. According to a related implementation, modifying the dwell time modifies a composition of the duty cycle of one or more sequentially arranged optical elements.

According to another implementation, one or more optical element of the set of sequentially-arranged optical elements spends a portion of a duty cycle steering the at least some of the light from the first subset to the second subset to increase the dynamic range of the image. According to a related implementation, the portion of the duty cycle corresponds to a light intensity level of a light intensity zone of the image.

According to another implementation, the set of sequentially-arranged optical elements comprises one or more rotatable mirrors. According to a related implementation, at least one of the one or more rotatable mirrors is mounted on a gimbal.

According to an implementation, the set of sequentially-arranged optical elements comprises one or more digital micro-mirror devices.

According to another implementation, the system for producing an image having high dynamic range further comprises a drive system for configuring the spatial light modulator to produce the image based on image content data; and wherein the drive system configures the set of sequentially-arranged optical elements to steer the light to the plurality of illumination zones of the spatial light modulator based on the image content data.

According to another implementation, the light source comprises a laser light module.

According to another implementation, the light source comprises at least one of a light emitting diode and a laser-phosphor hybrid light source.

According to another implementation, the light source comprises a lamp.

According to another implementation, the system for producing an image having high dynamic range further comprises light collimating optics.

According to another implementation, the spatial light modulator comprises a digital micromirror device.

According to another implementation, the spatial light modulator comprises a liquid crystal device.

According to one implementation, there is provided a method for producing an image having high dynamic range, comprising: providing light along an optical path; steering the light by one or more sequentially arranged optical elements to increase the dynamic range of an image; and directing the light to produce an image.

According to one implementation, the steering further comprising modifying a dwell time of the one or more sequentially arranged optical elements.

According to one implementation, the method for producing an image having high dynamic range further comprises modifying a composition of the duty cycle of one or more sequentially arranged optical elements.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
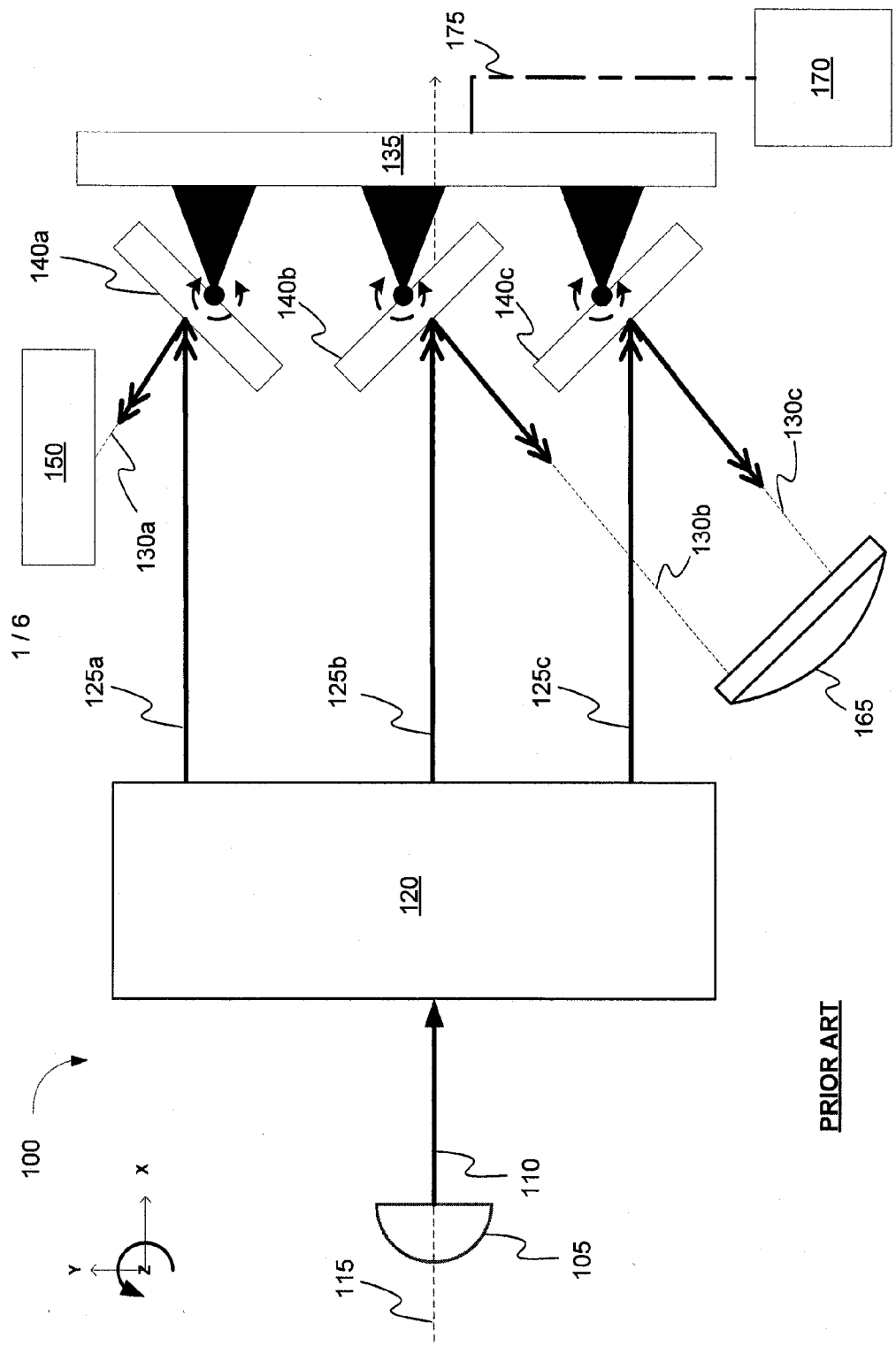
FIG. 1 depicts a schematic representation of a projection system, according to prior art implementations.

FIG. 1 depicts a schematic representation of prior art projection system 100. Projection system 100 comprises light source 105 that provides (e.g. transmits) light 110 along optical path 115. According to some implementations, light source 105 comprises a lamp, such as a Xenon lamp and a parabolic reflector. According to some implementations, light source 105 comprises a laser light module. Light 110 is transmitted to intermediate optics 120. Intermediate optics 120 manipulates light 110 to produce light cones 125a, 125b and 125c, referred to collectively as light cones 125 and depicted as arrows for simplicity. Intermediate optics 120 can include, for example, one or more integrating rods, prisms, relay lenses and mirrors. It is understood that light 110 comprises the light of light cones 125a, 125b and 125c. In other words, light cones 125a, 125b and 125c are portions or subsets of light 110. It is understood that "manipulating light" (and the equivalent) can include, for example, one or more of collecting, homogenizing, filtering and relaying light.

Each of light cones 125a, 125b and 125c is provided along a respective optical path 130a, 130b and 130c (also referred to as light paths 130a, 130b and 130c). Although optical paths 115 and 130b appear to be at least initially parallel, according to some implementations, none of light cones 125a, 125b and 125c have an optical path that is collinear with optical path 115. Alternatively, according to some implementations, one or more of optical paths 130a, 130b and 130c may be collinear with optical path 115. Furthermore, although only three light cones are depicted in FIG. 1, according to some implementations two or more light cones, including more than three light cones, are transmitted by intermediate optics 120.

It will be understood that the terms "light path" and "optical path" are used herein to denote the path along which light can and may travel in the system. As a result, unless otherwise indicated, the terms "light path" and "optical path" will be considered interchangeable with each other.

Light cones 125 are transmitted to Spatial light modulator (SLM) 135. SLM 135 can be provided by, for example, Texas Instruments™. For simplicity, SLM 135 is depicted as having three mirrors, referred to individually as mirrors 140a, 140b and 140c and collectively as mirrors 140, for receiving light, such as light cones 125, and producing an image based upon at least one received light cone. Each one of the mirrors 140 corresponds to a pixel of the produced image. According to some implementations, SLM 135 will have more than three mirrors arranged in a grid pattern. For example, SLM 135 can be a 4K resolution SLM having a resolution of 4096×2160 pixels and over 8 million micro-mirrors in a grid pattern.

Mirrors 140 can be independently switched (i.e. actuated) to an OFF-state, in which the received light is not transmitted to projection optics 165, and an ON-state, in which the received light is transmitted to projection optics 165. For example, as depicted in FIG. 1, light cone 125a is received by mirror 140a, which directs the received light cone 125a towards light dump 150. Since optical path 130a is an optical or light path light cone 125a travels or is transmitted along to an OFF-state SLM mirror (mirror 140a), optical path 130a will be considered an OFF-state optical or light path. In other words, by virtue of being an optical or light path destined for an OFF-state SLM mirror or region other than for being transmitted to projection optics 165 (such as directly to a light dump 150), such an optical or light path is considered, for the purposes of this disclosure, to be an OFF-state optical or light path. According to some implementations, one or more of SLM mirrors 140b and 140c are switched to an OFF-state, which would then result in the respective one or more optical paths 130b and 130c becoming OFF-state optical or light path(s). According to some implementations, mirror 140a is switched to an ON-state, which would then result in optical path 130a becoming an ON-state light path.

In a SLM imaging device, such as prior art projection system 100 and as exemplified by the Digital Light Processing (DLP™) technology of Texas Instruments, the dynamic range of a projected image is limited by the switching speed of the SLM, and by said systems' ability to segregate OFF-state light from the projection path. Grey scale aspects of the image are created using pulse width modulation (PWM) techniques. Thus, for a SLM device full white is achieved by leaving the SLM mirrors, such as mirrors 140a, 140b and 140c, in the ON-state for the duration of the SLM mirror duty cycle, full black is achieved by leaving the mirrors in the OFF-state for the SLM mirror duty cycle, while minimal grey is achieved by having the mirrors in the ON-state for the shortest period of time during the SLM duty cycle that can be supported by the SLM. In other words, the portion of the duty cycle each SLM mirror spends in a particular state dictates the intensity ("brightness") of the pixel.

Light cones 125b and 125c are received and directed by mirrors 140b, 140c to projection optics 165 where the resulting image may be projected onto a screen (not shown). Contrary to optical path 130a, since optical paths 130b and 130c are optical or light paths along which light cones 125b and 125c travel or are transmitted to an ON-state SLM mirror (mirrors 140b, 140c), optical paths 130b and 130c are considered, in the system 100, to be ON-state optical or light paths. Although FIG. 1 depicts each one of light cones 125a, 125b and 125c being received and directed by a different one of mirrors 140a, 140b and 140c, in some implementations, each one of mirrors can receive and direct more than one of light cones 125a, 125b and 125c. Projection system 100 further includes drive system 170 in communication with SLM 135 via communication path 175. Drive system 170 configures SLM 135 to produce an image by, for example, switching mirrors 140 between an ON-state and an OFF-state based on the above-described PWM techniques.

Projection system 100 may also include additional light dumps or analogous devices (not shown) to absorb any light spillage from light cones 125 as received or directed by SLM 135 via mirrors 140. Furthermore, projection system 100 can comprise additional light directing and/or directing devices specifically included for the purpose of directing light to OFF-state light paths or regions. For example, projection system 100 can include an additional SLM to help direct light OFF-state.

Figure 2:
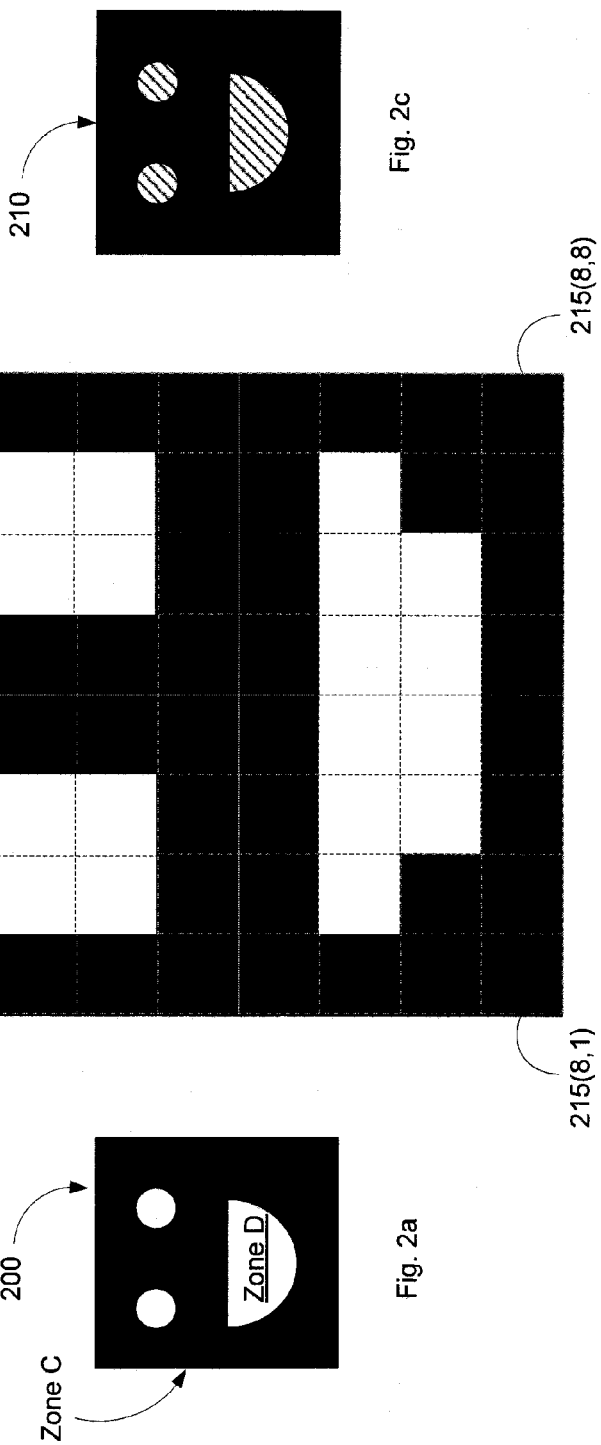
FIG. 2a depicts a desired image to be projected by a digital projection system according to prior art implementations.
FIG. 2b depicts a front view of a representative spatial light modulator (SLM) configured to produce the desired image of FIG. 2a, according to prior art implementations.
FIG. 2c depicts the desired image as produced by the SLM of FIG. 2c.

Reference is now made to FIGS. 2a, 2b and 2c, depicting desired image 200, SLM 205 and image 210, produced by SLM 205, to illustrate disadvantages of prior art projection systems, such as projection system 100. SLM 205 includes set of mirrors 215 comprised of mirrors 215(1,1) to 215 (8,8). It would be understood that the configuration of the set of mirrors 215 is not limited to an 8×8 configuration, but any suitable configuration of mirrors 215 can be used. Each one of mirrors 215(1,1) to 215 (8,8) corresponds to a pixel of image 210.

As shown in FIG. 2a, desired image 200 includes both bright and dark areas (or zones). In order to produce an image based upon desired image 200, SLM 205, and particularly mirrors 215(1,1) to 215 (8,8) are actuated to direct the received light to OFF-state and ON-state optical paths. Dark zones of desired image 200 (e.g. Zone C) correspond to OFF-state mirrors (e.g. mirrors 215(4,1), 215(4,2), 215(5,1) and 215(5,2)) and bright zones (e.g. Zone D) correspond to ON-state mirrors (e.g. mirrors 215(6,2) to 215(6,7) and 215 (7,3) to 215(7,6)) of the set of mirrors 215.

Prior art projection systems and devices, such as projection system 100 and SLM 205, require that the illumination of the SLM be uniform over the entire SLM imaging surface. In other words, the amount of light received by each mirror of the SLM (e.g. mirrors 140 and 215(1,1) to 215 (8,8)) is required by these systems to be generally equal. This results in the illumination of the brightest areas being limited by the overall illumination of the SLM mirrors. This may, in some cases, not result in an image that is a true representation of the original or desired image, particularly if that original or desired image constitutes an image having high dynamic range. For example, in image 210 produced by SLM 205, the brightest areas (represented by the hashed lines) are not as bright as the brightest areas of desired image 200.

Figure 3:
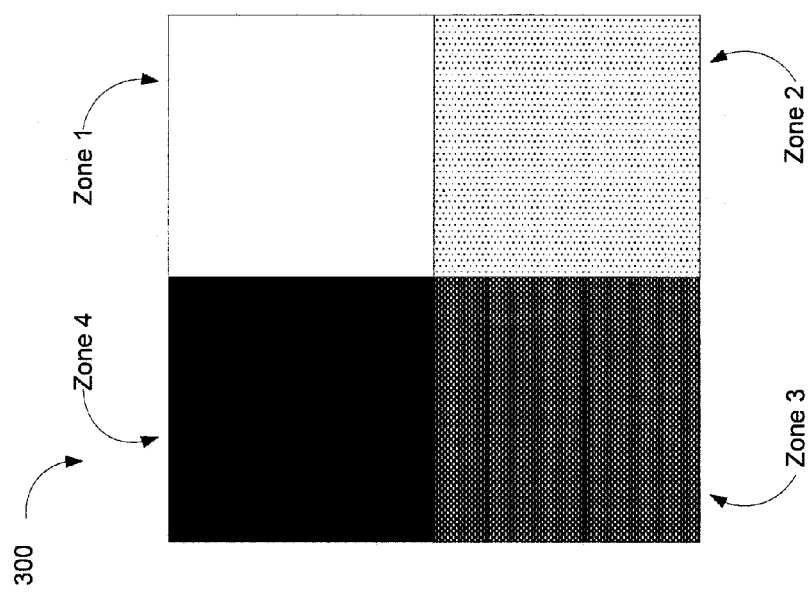
FIG. 3 depicts an image having high dynamic range that is to be projected according to non-limiting implementations.
Figure 4:
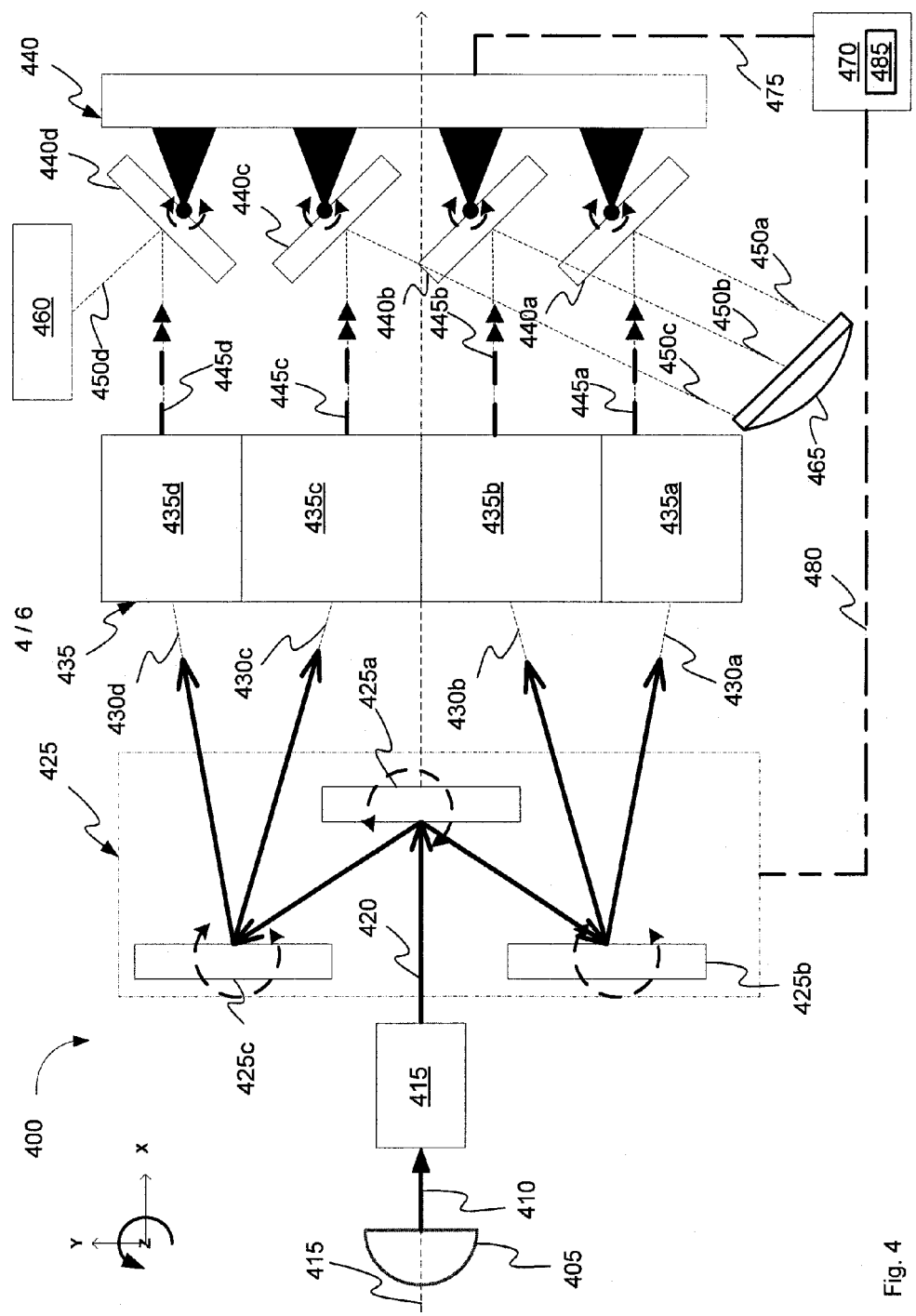
FIG. 4 depicts a system for producing an image having high dynamic range, according to non-limiting implementations.

Attention is directed to FIG. 3, which depicts high dynamic range image 300 (also referred herein as "image 300") to be projected, according to non-limiting implementations, such as system 400 depicted in FIG. 4. Image 300 has four zones of light intensity, Zone 1, Zone 2, Zone 3 and Zone 4. As shown, Zone 1 has the greatest light intensity, followed by Zone 2, which is followed by Zone 3 and Zone 4 (having the least amount of light intensity). In other words, Zone 1 represents the bright zone of image 300, Zone 2 represents the second brightest zone of image 300, Zone 3 represents the third brightest zone of image 300 and Zone 4 represents the least bright zone of image 300 (i.e. the darkest zone of image 300). It is understood that although image 300 is illustrated as having four zones of light intensity, according to some implementations, image 300 can have one or more zones of light in various configurations.

Current projection systems, such as prior art projection system 100, are unable to shift light from illumination areas or zones of the SLM imaging surface that are to show low-level (dark) content to those illumination areas or zones that are to show high-level (bright) content. As a result, much of the light that is provided or generated by the light source is discarded (e.g. sent to a light dump). This leads to inefficient use of power, increased thermal load from discarded light, poor contrast and brightness performance amongst other effects.

As will be presently understood, herein described is a system for producing an image having a high dynamic range that utilizes a set of sequentially-arranged light steering devices to direct light into one of several illumination zones of the SLM. As a result, the incident light is not distributed evenly across the SLM. The provided light can be divided as the system requires since the light steering devices can have switching times that are faster than the framerate of the content.

Attention is directed to system 400 for producing an image having dynamic range, such as image 300, according to non-limiting implementations. System 400 comprises SLM 440 for directing portions of light to OFF-state and ON-state light paths, thereby producing image 300. Furthermore, SLM 440 is divided into a plurality of illumination zones in which each illumination zone corresponds to a light intensity zone of image 300. Since image 300 has four light intensity zones, SLM 440 is divided into four illumination zones. The term "illumination zone" as used herein, refers to an area of the SLM imaging surface (i.e. the SLM mirrors) that receive light for producing an image. For simplicity, each the four illumination zones are represented by mirrors 440a, 440b, 440c and 440d, where: mirror 440a represents one or more SLM mirrors configured to correspond to Zone 1, mirror 440b represents one or more SLM mirrors configured to correspond to Zone 2, mirror 440c represents one or more SLM mirrors configured to correspond to Zone 3 and mirror 440d represents one or more SLM mirrors configured to correspond to Zone 4. For example, SLM 440 can be a 4K resolution SLM having a resolution of 4096×2160 pixels and over 8 million micro-mirrors in a grid pattern. In this example, each one of mirrors 440a, 440b, 440c and 440d represents 2 million micro-mirrors. It is understood that SLM 440 could be divided into a variety of illumination zones of differing arrangements, depending on the arrangement of the light intensity zones and desired image characteristics of the image to be produced. Although in this implementation the 440 are shown in a linear arrangement, in variations, the shape of the arrangement can vary.

SLM 440 can comprise a wide range of light modulating devices, including, for example, a digital micromirror device (DMD) and a liquid crystal device (LCD).

Furthermore, it is understood that each of the illumination zones represented by mirrors 440a, 440b, 440c and 440d is switched using PWM to achieve the appropriate light intensity of Zone 1, Zone 2, Zone 3 and Zone 4 as per image 300. In FIG. 4, mirror 440d is shown in the OFF-state, since it is directing received light away from projection optics, towards light dump 460. Mirrors 440a, 440b and 440c are shown in an ON-state to direct received light to projection optics 460a.

System 400 further comprises light source 405 for providing light 410 along optical path 415. According to some implementations, light source 405 comprises a lamp, such as a Xenon lamp having a parabolic reflector. According to some implementations, light source 405 comprises a laser light module. According to some implementations, the light source can comprise at least one of a light emitting diode (LED) and a laser-phosphor hybrid light sources. According to some implementations, light 410 is transmitted to intermediary optics 415 to modulate light 410. For example, intermediary optics 415 can comprise one or more optical elements for collimating light 410. According to some intermediary optics 415 can include, for example, one or more integrating rods, prisms, relay lenses and mirrors. Intermediary optics 415 transmits (i.e. outputs) modulated light 420. It is understood that modulated light 420 comprises light 410. However, it is understood that intermediary optics 415, and the therefore the resulting light modulation, is not necessary for operation of the systems described herein. Therefore, although reference herein is made to "modulated light 420", according to some implementations the referenced "modulated light 420" can comprise light 410 without any modulation applied thereto. Furthermore, according to some implementations, "modulated light 420" comprises light 410 that has been manipulated, as defined above, rather than modulated. According to some implementations, "modulated light 420" comprises light 410 that has been both modulated and manipulated (as defined above).

Modulated light 420 is transmitted to a set of sequentially-arranged optical elements 425 in optical path 415 for steering at least some of modulated light 420 from a first subset of illumination zones (Zone 1, Zone 2, Zone 3, Zone 4) to a second subset of illumination zones (Zone 1, Zone 2, Zone 3, Zone 4) to increase the dynamic range of an image. In the implementation shown in FIG. 4, modulated light 420 is received by optical element 425a. Similar to a "pinball", optical element 425a either directs modulated light 420 to optical element 425b or directs modulated light 420 to optical element 425c. According to some implementations, optical element 425a is rotatable to direct the modulated light 420. For example, according to some implementations, optical element 425a is mounted on a pivoted support, such as a gimbal. According to some implementations, optical element 425a comprises a spatial light modulator (SLM). For example, optical element 425a can comprise a low resolution SLM.

Although the set of sequentially-arranged optical elements 425 is shown in FIG. 4 as comprising only three optical elements (425a, 425b, 425c), according to some implementations, the set of sequentially-arranged optical elements 425 comprises more than three optical elements arranged in a tree-structure such that every "branch" (represented by an optical element, or a subset of optical elements) directs modulated light 420 to a respective illumination zone on SLM 440. For example, the set of sequentially-arranged optical elements 425 can comprise 7 optical elements. Accordingly, in this example, the elements 425b and 425c would direct modulated light to one of additional four optical elements, providing at least eight illumination zones. According to some implementations, each of the sequentially arranged optical elements 425 can steer light in more than two directions. Accordingly, in these implementations, optical element 425a can steer light, for example, to four different optical elements to achieve the "pinball" effect. In some implementations, each of the sequentially arranged optical elements can steer light in a different number of directions. Moreover, in variations, the number of directions light can be steered by each sequentially arranged optical element can be varied dynamically, thus altering the number and arrangement of zones.

Modulated light 420 is then directed to second intermediary optical element 435 along one of optical paths 430a, 430b, 430c and 430d by either optical element 425b or 425b. According to some implementations, one or more of optical elements 425b and 425c are rotatable to direct modulated light to a respective one of optical paths 430a, 430b, 430c and 430d. For example, according to some implementations, one or more of optical elements 425b and 425c are mounted on a pivoted support, such as a gimbal. According to some implementations, one or more of optical elements 425b and 425c comprise a spatial light modulator (SLM). For example, one or more of optical elements 425b and 425c can comprise a low resolution SLM.

According to some implementations, system 400 further comprises second intermediary optical element 435 for capturing and further relaying modulated light 420. For example, second intermediary optical element 435 can homogenize modulated light 420. Second intermediary optical element 435 directs the further modulated light as one of modulated light 445a, 445b, 445c and 445d along a respective optical path. For example, to produce Zone 4 of image 300, the darkest zone, modulated light received by Zone 435d is directed as modulated light 445d along optical path 450d to light dump 460 (rather than projection optics 465). It is understood, that since Zone 4 has the least amount of light intensity in comparison to the remaining three zones, the least amount or proportion of light 410 will be directed to Zone 435d and mirror 440d. In contrast, since Zone 1 has the greatest amount of light intensity, the greatest amount or proportion of light 410 will be directed to Zone 435a and mirror 445a.

As illustrated in FIG. 4, second intermediary optical element 435 is divided into four zones, each zone corresponding to an illumination zone of SLM 440. Zone 435a corresponds to the illumination zone represented by mirror 440a, Zone 435b corresponds to the illumination zone represented by mirror 440b, Zone 435c to the illumination zone represented by mirror 440c and Zone 435d corresponds to the illumination zone represented by mirror 440d. According to some implementations, second intermediary optical element 435 comprises an array of integrating rods.

The amount or proportion of light 410 received by any one of the illumination zones represented by mirrors 440a, 440b, 440c and 440d, and therefore the light intensity of the associated zone of image 300, can be controlled by adjusting the amount of time each optical element 425a, 425b and 425c spends during its respective duty cycle directing modulated light 420 to any one of the illumination zones represented by mirrors 440a, 440b, 440c and 440d.

Drive system 470 configures SLM 440 to produce the image based on image content data 485. Drive system 470 is in communication with SLM 440 via communication path 475. According to some implementations, drive system 470 is in two-way communication with SLM 440 (i.e. drive system 470 can communicate or transmit data to SLM 440 and, vice-versa, SLM 440 can communicate or transmit data to drive system 470). According to some implementations, the communication between drive system 470 and SLM 440 is one-way. However, any suitable manner of communication between drive system 470 and SLM 440 is contemplated. For example, drive system 470 can be remote from SLM 440 and communicate with SLM 440 wirelessly. In another example, drive system 470 and SLM 440 can be connected via wired connection and/or mechanical connection. Furthermore, although FIG. 4 depicts a particular path for communication between drive system 470 and SLM 440, it is contemplated that communication path 475 comprises any of one or more communication paths suitable for communication between drive system 470 and SLM 440. For example, communication path 475 can comprise any combination of wired and/or wireless communication paths as desired.

Drive system 470 also configures the set of sequentially-arranged optical elements 425 to steer at least some for steering at least some of modulated light 420 from a first subset of illumination zones (Zone 1, Zone 2, Zone 3, Zone 4) to a second subset of illumination zones (Zone 1, Zone 2, Zone 3, Zone 4) based on image content data 485. Drive system 470 is in communication with the set of sequentially-arranged optical elements 425 via communication path 480. According to some implementations, drive system 470 is in two-way communication with the set of sequentially-arranged optical elements 425 (i.e. drive system 470 can communicate or transmit data to the set of sequentially-arranged optical elements 425 and, vice-versa, the set of sequentially-arranged optical elements 425 can communicate or transmit data to drive system 470). According to some implementations, the communication between drive system 470 and the set of sequentially-arranged optical elements 425 is one-way. However, any suitable manner of communication between drive system 470 and the set of sequentially-arranged optical elements 425 is contemplated. For example, drive system 470 can be remote from the set of sequentially-arranged optical elements 425 and communicate with the set of sequentially-arranged optical elements 425 wirelessly. In another example, drive system 470 and the set of sequentially-arranged optical elements 425 can be connected via wired connection and/or mechanical connection. Furthermore, although FIG. 4 depicts a particular path for communication between drive system 470 and the set of sequentially-arranged optical elements 425, it is contemplated that communication path 480 comprises any of one or more communication paths suitable for communication between drive system 470 and the set of sequentially-arranged optical elements 425. For example, communication path 480 can comprise any combination of wired and/or wireless communication paths as desired.

According to some implementations, drive system 470 comprises a computing device having a processor to configure SLM 440 and the set of sequentially-arranged optical elements 425 based on image content data 485. According to some implementations, image content data 485 is stored at a local memory device of drive system 470. According to some implementations, image content data 485 is transmitted to drive system 470 or retrieved by drive system 470 from another device via a wired or remote connection.

As a non-limiting example implementation, image content data 485 can comprise a frame of image content having data for all three primary colours and the number of zones of light intensity of the image to be produced. In some cases, the frame of image content could be separated into red, blue and green wavelengths of light, corresponding to the three primaries of projection system 400. Each such separated frame of image content will be referred to herein, for the purpose of this non-limiting example, as a "subframe". Hence, in this example, there are three subframes, one for each portion of the frame of image content corresponding to a primary colour wavelength of light (e.g. a red light subframe). However, it is understood that it is not necessary for the frame of image content be separated into red, blue and green wavelengths of light.

In this non-limiting example, each one of the subframes (e.g. the red light subframe) is divided into four light intensity zones of the image to be produced (e.g. Zone 1, Zone 2, Zone 3 and Zone 4 of image 300). Each one of the four light intensity zones will correspond to one of optical paths 430a, 430b, 430c and 430d that modulated light 420 is directed along by the set of sequentially-arranged optical elements 425 to one of Zones 435a, 435b, 435c and 435d, and to, ultimately, one of the illumination zones represented by mirrors 440a, 440b, 440c and 440d. In this non-limiting example, the light intensity zones will have equal width and height.

For each one of the light intensity zones of the image, the pixel corresponding to the brightest spot in that light intensity zone is determined. In other words, the mirror in each illumination zone represented by mirrors 440a, 440b, 440c and 440d that corresponds to the brightest spot in the corresponding light intensity zone, and the corresponding optical path of optical paths 430a, 430b, 430c and 430d along which modulated light 420 is directed, is determined. Since, ideally, for a particular light intensity zone only enough light to properly illuminate this pixel is provided to that particular illumination zone, the amount of light (i.e. light intensity) required to properly illuminate the brightest pixel corresponds to the amount of light that is required to be provided to the entire zone.

In this example, since there are four light intensity zones, for each subframe there will be four "brightest pixels" (one "brightest pixel" for each light intensity zone). For the purposes of this non-limiting example, the light intensity associated with each "brightest pixel" will be referred to herein as "$P_a$" (the light intensity associated with the brightest spot located in Zone 1), "$P_b$" (the light intensity associated with the brightest spot located in Zone 2), "$P_c$" (the light intensity associated with the brightest spot located in Zone 3) and "$P_d$" (the light intensity associated with the brightest spot located in Zone 4).

Next, for simplicity, the light intensity of $P_a$, $P_b$, $P_c$ and $P_d$ is normalized to become $P_a'$, $P_b'$, $P_c'$ and $P_d'$ such that $$P_a' + P_b' + P_c' + P_d' = 1 \quad (1)$$

For example, $$P_a' = \frac{P_a}{P_a + P_b + P_c + P_d} \quad (2)$$

Where each of $P_a'$, $P_b'$, $P_c'$ and $P_d'$ in equation (1) represents the light intensity of $P_a$, $P_b$, $P_c$ and $P_d$ expressed in a fraction of the total light delivered to mirrors 440a, 440b, 440c and 440d. Although in this example the light intensity of $P_a$, $P_b$, $P_c$ and $P_d$ is normalized, it is understood that the example implementation can be performed without such normalization.

Each one of optical elements 425a, 425b and 425c will divide the period of a duty cycle, such as L referred to above, into portions or fractions of that duty cycle for directing modulated light 420 such that it is directed along one of optical paths 430a, 430b, 430c and 430d. For example, optical element 425a can spend portion of time "a", as a fraction of L having a value of 1, directing modulated light 420 towards optical element 425c and portion of time (1−α) directing modulated light 420 towards 420b.

In this non-limiting example, optical element 425c will divide duty cycle, L, into three parts, A, B and C. "A" represents the time in which optical element 425c does not receive modulated light 420 from optical element 425a (i.e. optical element 425a is not directing modulated light 420 to optical element 425c) and can therefore be in any state/position. In this case, "A" represents (1−α) of L. "B" represents the time in which optical element 425c is receiving modulated light 420 from optical element 425a (i.e. optical element 425a is directing modulated light 420 to optical element 425c) and directs modulated light 420 along optical path 430d to Zone 435d. In this case, "B" represents (α*β) of L, where "β" represents a fraction of the portion of duty cycle L in which optical element 425c receives light from optical element 425a. "C" represents the time in which optical element 425c is receiving modulated light 420 from optical element 425a (i.e. optical element 425a is directing modulated light 420 to optical element 425c) and directs modulated light 420 along optical path 430c to Zone 435c. In this case, "C" represents (α*(1−β)) of L.

It is understood that the light intensity of a zone of an image is proportional to the time the corresponding illumination zone of the SLM is illuminated. As a result, it can be written:

$$P_d' = \alpha\beta \quad (3)$$

$$P_c' = +(1-\beta) \quad (4)$$

$$P_b' = (1-\alpha)\gamma \quad (5)$$

$$P_a' = (1-\alpha)(1-\gamma) \quad (6)$$

Since the values of $P_a'$, $P_b'$, $P_c'$ and $P_d'$ are known (see equations 1 and 2), α, β and γ can be written as:

$$\alpha = 1 - (P_a' + P_b') \quad (7)$$
$$= (P_c' + P_d')$$

$$\beta = \frac{P_d'}{P_c' + P_d'} \quad (8)$$

$$\gamma = \frac{P_b'}{P_a' + P_b'} \quad (9)$$

As a further non-limiting example, in a case where the four brightest pixels in the image can be described as $P_a=1$, $P_b=1$, $P_c=3$ and $P_d=5$, based on equations (1) and (2), the normalized values of $P_a$, $P_b$, $P_c$ and $P_d$ would be approximately 0.1 (for $P_a'$), 0.1 (for $P_b'$), 0.3 (for $P_c'$) and 0.5 (for $P_d'$). Based on equations 7, 8 and 9, the values of α, β and γ would be approximately 0.8 (α), 0.625 (β) and 0.5 (γ). Schematically, the duty cycle, L, would be divided as shown in Table 1, Table 2 and Table 3.

TABLE 1

Division of Duty Cycle of Optical Element 425a
Duty Cycle of 425a

| Direct Light Toward 425b | Direct Light Toward 425c |
|---|---|
| 20% | 80% |
| (1 − α) | (α) |

TABLE 2

Division of Duty Cycle of Optical Element 425b
Duty Cycle of 425b

| Direct Light Toward 430a | Direct Light Toward 430b | Indeterminate State (no Illumination) |
|---|---|---|
| 10% | 10% | 80% |
| (1 − α)(1 − γ) | (1 − α)γ | |

TABLE 3

Division of Duty Cycle of Optical Element 425c
Duty Cycle of 425c

| Indeterminate State (no Illumination) | Direct Light Toward 430c | Direct Light Toward 430d |
|---|---|---|
| 20% | 30% | 50% |
| | α(1 − β) | (αβ) |

It is understood that the values stated in the above non-limiting examples are representative of the ideal case since, for simplicity, light losses and other losses have not been taken into account in these non-limiting examples.

Figure 5:
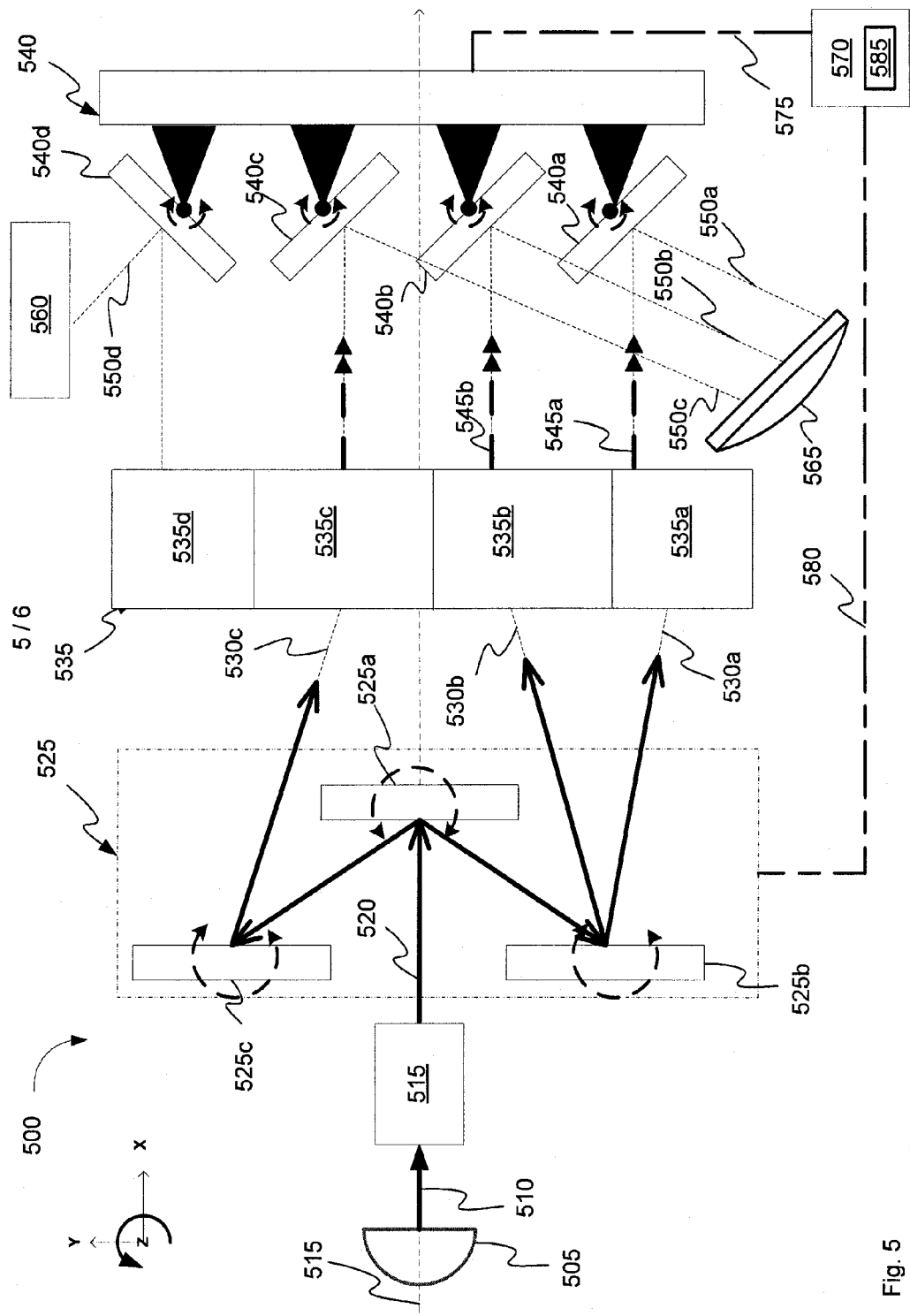
FIG. 5 depicts a system for producing an image having high dynamic range, according to non-limiting implementations.

Attention is directed to FIG. 5, depicting system 500 for producing an image having high dynamic range according to non-limiting implementations and comprising elements similar to FIG. 5, with like elements having like numbers, however starting with a "5" rather than a "4". For example, system 500 includes a light source 505 which provides or transmits light 510 along optical path 515. As in system 400, SLM 540 is divided into a plurality of illumination zones, each one of the illuminating zone corresponding to a zone of light intensity of an image to be produced by SLM 540. Similar to SLM 440, SLM 540 is divided into four illumination zones. For simplicity, each the four illumination zones are represented by mirrors 540a, 540b, 540c and 540d, where: mirror 540a represents one or more SLM mirrors configured to correspond to a first zone of illumination, mirror 540b represents one or more SLM mirrors configured to correspond to a second zone of illumination, mirror 540c represents one or more SLM mirrors configured to correspond to a third zone of illumination and mirror 540d represents one or more SLM mirrors configured to correspond to a fourth zone of illumination.

As stated above, the amount or proportion of light 510 received by any one of the illumination zones represented by mirrors 540a, 540b, 540c and 540d, and therefore the light intensity of the associated zone of the produced image, can be controlled by adjusting the amount of time optical elements 525a, 525b and 525c spends during its respective duty cycle directing modulated light 520 to any one of the illumination zones represented by mirrors 540a, 540b, 540c and 540d. In other words, the time each one of optical elements 525a, 525b and 525c spend directing modulated light 520 to one of the illumination zones represented by mirrors 540a, 540b, 540c and 540d, also referred herein as the "dwell time" of optical elements 525a, 525b, 525c and 525d, corresponds to the intensity of the corresponding light intensity zone of the image. Accordingly, the steering of light can be accomplished by altering the composition of the duty cycle of an optical element 525 by varying the time each one of optical elements 525a, 525b and 525c spend directing modulated light 520 to one of the illumination zones.

As a non-limiting example, if system 500 is configured to produce an image having three zones of equal light intensity (corresponding to the illumination zones represented by mirrors 540a, 540b and 540c) and one zone having minimal or zero light intensity (i.e. full black) (corresponding to the illumination zone represented by mirror 540d), then the amount of light 510 provided during a particular time period can be, for example, divided by three and distributed evenly among the illumination zones of SLM 540.

In order to accomplish this light distribution, optical element 525a would spend approximately one third of its duty cycle, referred to as "L", directing modulated light 520 to optical element 525b and the remaining two-thirds of L directing modulated light 520 to optical element 425c. Since optical element 525b directs modulated light 520 to two of the three illumination zones of SLM 540 corresponding to zones of equal light intensity of the image, optical element 525b directs approximately half of the received modulated light 520 to mirror 540a (via Zone 535a of second intermediary optical element 535) and directs the remaining half of the received modulated light 520 to mirror 540b (via Zone 535b of second intermediary optical element 535). In other words, optical element 525b spends approximately one-third of the duty cycle, L, of optical element 525a directing received modulated light 520 to mirror 540a and approximately one-third of the duty cycle, L, of optical element 525a directing received modulated light 520 to mirror 540b.

On the other hand, since optical element 525b directs modulated light 520 to only one of the three illumination zones of SLM 540 corresponding to zones of equal light intensity of the image, optical element 525b directs all of the received modulated light 520 to mirror 540c (via Zone 535c of second intermediary optical element 535). In other words, optical element 525c spends approximately one third of L directing received modulated light 520 to mirror 540c. Since the zone of light intensity corresponding to the illumination zone represented by mirror 540d is full black, optical element 525d does not spend any portion of L directing any light to mirror 540d.

Figure 6:
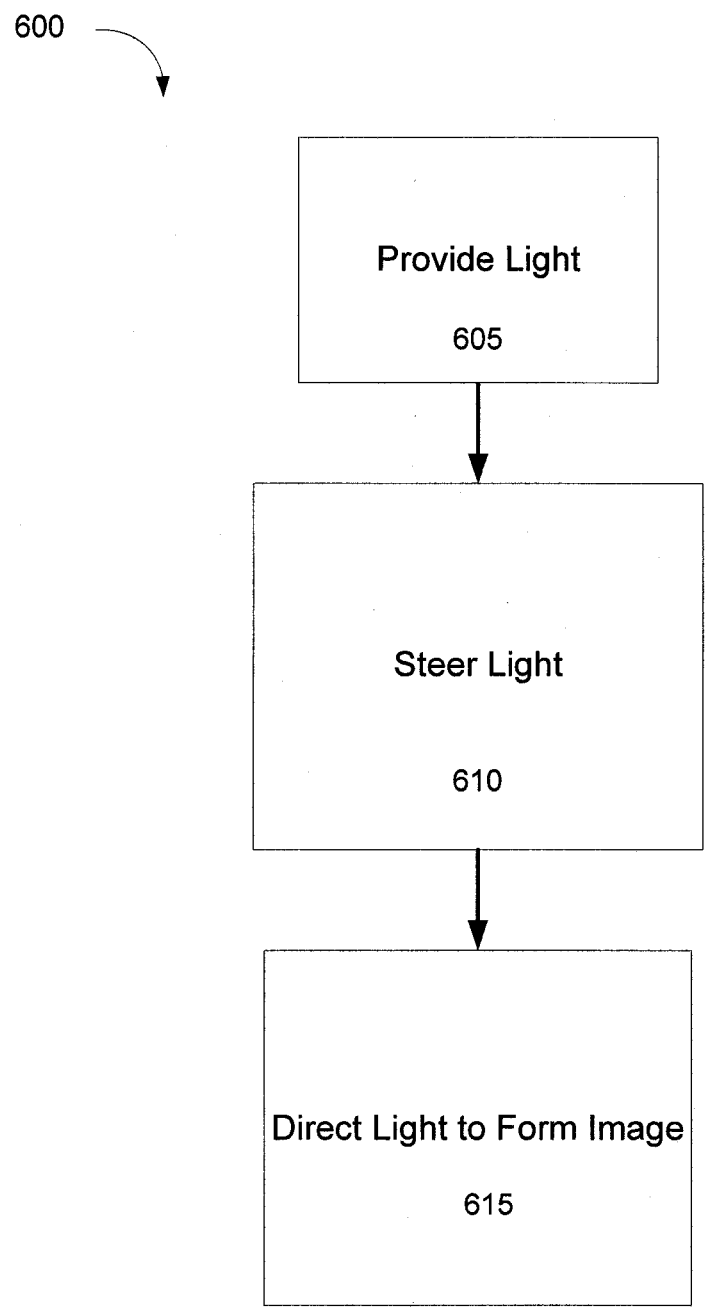
FIG. 6 depicts a flowchart of a method for producing an image having high dynamic range, according to non-limiting implementations.

Attention is now directed to FIG. 6 which depicts a flowchart of method 600 for producing an image having high dynamic range, according to non-limiting implementations. In order to assist in the explanation of method 600, it will be assumed that method 600 is performed using system 400. Furthermore, the following discussion of method 600 will lead to a further understanding of system 400 and its various components. However, it is to be understood that system 400 and/or method 600 can be varied, and need not work exactly as discussed herein in conjunction with each other, and that such variations are within the scope of present implementations. Furthermore, it will be understood that method 600 can be implemented by systems 400 and 500.

It is to be emphasized, however, that method 600 need not be performed in the exact sequence as shown, unless otherwise indicated; and likewise various blocks may be performed in parallel, for example, rather than in sequence; hence the elements of method 600 are referred to herein as "blocks" rather than "steps". It is also to be understood, however, that method 600 can be implemented on variations of systems 400 and 500 as well. For example, method 600 could employ a set of sequentially-arranged optical elements comprising more than three optical elements.

At block 605, light is provided along an optical path. For example, light 410 is provided by light source 405 along optical path 415.

At block 615, at least some of the light is steered from a first subset of a plurality of illumination zones to a second subset of a plurality of illumination zones to increase the dynamic range of the image. For example, referring to FIG. 4, the imaging surface of SLM 440 is divided into illumination zones corresponding to light intensity zones of image 300. As stated above, mirror 440a represents one or more SLM mirrors configured to correspond to Zone 1, mirror 440b represents one or more SLM mirrors configured to correspond to Zone 2, mirror 440c represents one or more SLM mirrors configured to correspond to Zone 3 and mirror 440d represents one or more SLM mirrors configured to correspond to Zone 4.

Continuing with the present example, optical element 425c can steer modulated light 420 away from mirror 440d, where modulated light 420, following OFF-state light path 450d, would have been directed to light dump 460, to mirror 440c, where modulated light 420 will be directed along ON-state light path 450c to projection optics 465. Since a greater portion of light 410 is being steered along an ON-state light path, more light overall is contributing to the light intensity of the associated light intensity zone. As a result, the dynamic range of the image is increased in comparison to an image produced by prior art projection systems, such as prior art projection system 100.

At block 610, portions of the provided light are directed to OFF-state and ON-state light paths according to illumination zones corresponding to an image, thereby producing an image. Modulated light 445a, 445b and 445c is directed by respective mirrors 440a, 440b and 440c along ON-state light paths 450a, 450b and 450c to projection optics 465. Modulated light 445d is directed by mirror 440d along OFF-state light path 450d to light dump 460.

Systems 400 and 500 can yield many advantages. First, since no area or zone of the SLM imaging surface received more light than it requires, there is less need to dump excess light. In turn, this means that unnecessary light is not generated, resulting in a more efficient system. Second, the described systems and methods can also result in better thermal management over prior art projection systems. Since there is less light being directed OFF-state and, dumped, less thermal energy needs to be removed. Likewise, since the SLM imaging surface receives only the light energy it needs, less energy is converted to heat on the SLM imaging surface. Third, the darkest areas receive less light, they will appear darker on the screen, thus leading to higher contrast levels. As a result, the lowest-achievable black level can be much lower than in projection systems without light steering. Finally, the described systems and methods can yield improved highlight levels since the bright levels will be displayed with enhanced brightness. Utilizing the described light steering systems and methods can allow for a subset of pixels on the SLM imaging surface to project more light than would have been possible has the light been distributed uniformly.

Persons skilled in the art will appreciate that there are yet more alternative implementations and modifications possible, and that the above examples are only illustrations of one or more implementations. The scope, therefore, is only to be limited by the claims appended hereto.

What is claimed is:

1. A system for producing an image having high dynamic range, comprising:
   a light source for providing light along an optical path;
   a spatial light modulator for directing portions of the light to off-state and on-state light paths, thereby producing an image, the spatial light modulator having a plurality of illumination zones corresponding to the image; and
   a set of sequentially-arranged optical elements in the optical path for steering at least some of the light from a first subset of the plurality of illumination zones to a second subset of the plurality of illumination zones to increase the dynamic range of the image.

2. The system of claim 1 further comprising:
   an intermediary optical element for capturing and modulating the steered light according to the plurality of illumination zones.

3. The system of claim 2, wherein the intermediary optical element comprises an array of integrating rods arranged to correspond to the plurality of illumination zones.

4. The system of claim 3, wherein at least one of the one or more rotatable mirrors is mounted on a gimbal.

5. The system of claim 2, wherein the modulation comprises homogenizing the steered light.

6. The system of claim 1 wherein a dwell time of the one of more sequentially arranged optical elements is modified to steer light.

7. The system of claim 6 wherein modifying the dwell time modifies a composition of the duty cycle of one or more sequentially arranged optical elements.

8. The system of claim 1, wherein one or more optical element of the set of sequentially-arranged optical elements spends a portion of a duty cycle steering the at least some of the light from the first subset to the second subset to increase the dynamic range of the image.

9. The system of claim 8, wherein the portion of the duty cycle corresponds to a light intensity level of a light intensity zone of the image.

10. The system of claim 1, wherein the set of sequentially-arranged optical elements comprises one or more rotatable mirrors.

11. The system of claim 1, wherein the set of sequentially-arranged optical elements comprises one or more digital micro-mirror devices.

12. The system of claim 1 further comprising:
    a drive system for configuring the spatial light modulator to produce the image based on image content data; and
    wherein the drive system configures the set of sequentially-arranged optical elements to steer the light to the plurality of illumination zones of the spatial light modulator based on the image content data.

13. The system of claim 1, wherein the light source comprises a laser light module.

14. The system of claim 1, wherein the light source comprises a lamp.

15. The system of claim 1, wherein the light source comprises at least one of a light emitting diode and a laser-phosphor hybrid light source.

16. The system of claim 1 further comprising light collimating optics.

17. The system of claim 1, wherein the spatial light modulator comprises a digital micromirror device.

18. The system of claim 1, wherein the spatial light modulator comprises a liquid crystal device.

19. A method for producing an image having high dynamic range, comprising:
    providing light along an optical path;
    steering the light by one or more sequentially arranged optical elements to increase the dynamic range of an image; and
    directing the light to produce an image.

20. The method of claim 19, the steering further comprising modifying a dwell time of the one or more sequentially arranged optical elements.

21. The method of claim 19 further comprising modifying a composition of the duty cycle of one or more sequentially arranged optical elements.

* * * * *